Jan. 21, 1964 C. J. EICHENAUER, JR., ETAL 3,119,069

CONTROL CIRCUIT

Filed Jan. 5, 1962 2 Sheets-Sheet 1

INVENTORS:
CARL J. EICHENAUER, JR.
HOWARD L. STORM,
BY Walter C. Bernkopf
THEIR ATTORNEY.

INVENTORS:
CARL J. EICHENAUER, JR.
HOWARD L. STORM,
BY Walter C. Bernkopf
THEIR ATTORNEY United States Patent Office 3,119,069

Patented Jan. 21, 1964

3,119,069
CONTROL CIRCUIT

Carl J. Eichenauer, Jr., and Howard L. Storm, Syracuse, N.Y., assignors to General Electric Company, a corporation of New York Filed Jan. 5, 1962, Ser. No. 164,480
7 Claims. (Cl. 328—69)

The present invention relates to control circuits and more particularly to control circuits for stabilizing the output voltage of an electronic pulse modulator.

In high power radio frequency pulse transmission systems a modulator is commonly used to generate pulses for application to the transmitting device, such as a magnetron. In general such pulses must be nearly rectangular and must have a steep leading edge in order to meet the required synchronization and range accuracies, and must be substantially flat topped so as to avoid frequency shifts in the transmitter. One commonly employed modulator providing such rectangular pulses, is termed a "line-pulsing modulator." A line-pulsing modulator has a charging impedance, pulse forming network, and a load circuit serially connected to a uni-directional high voltage power supply, and has a switch connected across the series combination of the pulse forming network and the load. Between pulses the switch is open and the power supply charges the network through the charging impedance and the load. When the pulse-forming network is charged, the switch is closed and the network discharges through the switch and supplies pulse energy to the output load, i.e. the transmitter. Satisfactory operation requires that the load impedance substantially equals the characteristic impedance of the pulse forming network. When a coupling transformer is employed to couple the modulator to the load, the apparent primary impedance of the transformer should substantially equal the characteristic impedance of the pulse forming network. If the load impedance increases, the voltage amplitude of the output pulses increases, so that with an infinite load impedance the pulse amplitude approaches twice the normal pulse amplitude. In high power transmission systems such a voltage increase can be destructive to both transmitter and modulator components, and, in particular, may result in destruction of magnetron devices or coupling transformers. Transmitter systems, particularly those employing magnetrons, occasionally exhibit increases in load impedance, which in the case of magnetrons may result from the failure of the device to oscillate properly. This may occur when the magnetron is new, approaching the end of its life, is being switched to a different pulse repetition frequency, or has become gaseous due to long non-use. Changes in load impedance that result in improper pulse voltages may also result in improper moding of the magnetron, i.e. oscillation of the device at improper frequencies.

Attempts have been made to prevent excessive increases in modulator pulse voltage amplitudes. This includes the use of spark gaps designed to arc in case of excessive modulator pulse amplitudes. Such devices are unsatisfactory, however, because they do not have uniform and constant breakdown voltage levels and because they dissipate modulator energy. Saturable devices have also been employed to assist in shaping the modulator output pulses, but these do not directly limit the modulator pulse amplitude.

It is an object of this invention to provide improved means for controlling modulator output signals to avoid destruction of modulator and transmitter components.

It is a second object of this invention to provide an improved non-energy dissipating voltage limiting system.

It is a third object of this invention to provide improved means to prevent voltage variations, including ripple components, in modulator output pulses.

It is a fourth object of this invention to provide a modulator control system which permits continued modulator transmitter operation despite sporadic short interval moding of the transmitter.

Briefly, in accordance with one aspect of this invention a line-pulsing modulator comprising a serially connected uni-directional high voltage source, charging impedance, pulse-forming network, and load is provided with a control circuit. This control circuit comprises a charge storage means connected from the junction of the pulse forming network and the load to a first diode connected to the other side of the load and oriented so as to charge the storage means to the load voltage during the duration of the pulse, i.e. the pulse interval, and a second unidirectional conducting device connected to the voltage source and oriented so as to discharge the charge storage means toward a predetermined potential during the interval between pulses, i.e. the interpulse period.

While the novel and distinctive features of the invention are particularly pointed out in the appended claims, a more expository treatment of the invention, in principle and in detail, together with additional objects and advantages thereof, is afforded by the following description and accompanying drawings in which:

Figure 1:
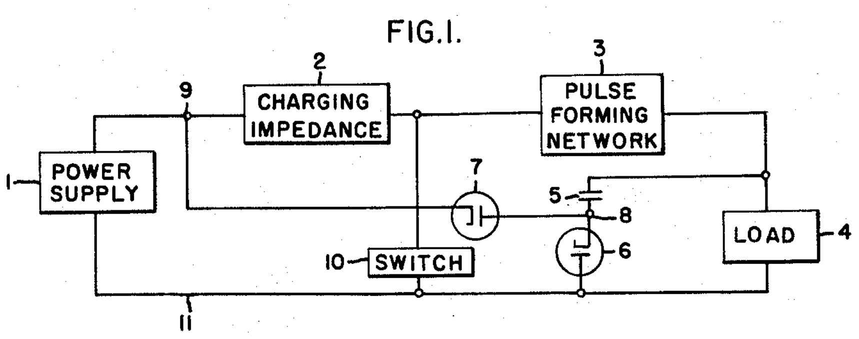
FIG. 1 is a block diagram of one embodiment of a modulator and voltage control circuit.

FIG. 1 illustrates a line-pulsing modulator in which power supply 1 is connected across the series combination of charging impedance 2, pulse-forming network 3 and load 4. A switch 10 is connected across the series combination of the pulse forming network 3 and the load 4. One side of the switch is connected to the junction between devices 2 and 3, and the other side is connected to line 11 which connects load 4 to power supply 1. The voltage control circuit comprises charge storage means 5, which may be a capacitor, and unilateral conducting devices 6 and 7, which may be diodes. Charge storage means 5 is connected serially with diode 6 across load 4, with capacitor 5 being connected to the junction of pulse forming network 3 and 4. A second uni-directional conducting device 7 is connected from the junction, 8, of capacitor 5 and device 6 to the junction, 9, between power supply 1 and charging impedance 2. The orientation of the uni-directional conducting devices is described below in connection with the discussion of operation.

The modulator portion of this circuit, comprising components 1 through 4 and 10, is known in the art. Such a modulator supplies high voltage rectangular pulses to a load, which generally comprises a transmitting device such as a magnetron. Conventionally the modulator is coupled to the transmitter by means of a pulse transformer, which for simplicity, is not illustrated in FIG. 1. The power supply 1 supplies a uni-potential voltage of large amplitude to the series combination of the charging impedance 2, the pulse forming network 3, and the load 4, and charges the pulse forming network. When switch 10 is closed the network 3 discharges through load 4 and switch 10, and thus supplies pulse energy to load 4. The pulse forming network 3 generally consists of an artificial line composed of serially connected inductances with parallel capacitances which has the characteristics of a long transmission line with distributed inductance and capacitance. The pulse forming network has a characteristic impedance that equals the square root of the inductance divided by the capacitance per unit length of line. If the line is charged through an impedance greater than the characteristic impedance, the time constant of the charging exponential curve approaches the product of the characteristic impedance and the storage capacitance of the network, i.e. the capacitance measured with all inductances short-circuited. For modulator design purposes it is desirable to have the pulse forming network become equivalent to a capacitance during the charge interval, which is achieved by means of the high charging impedance. During the charging process the impedance of the load 4 may be neglected since it is extremely small in comparison to the charging impedance. Neglecting the effects of switch 10, the series network of elements 1 through 4 operates so that network 3, which is equivalent to the storage capacitance of the network, will charge sinusoidally, and continue to oscillate sinusoidally. However, when the network initially charges to its maximum potential, switch 10 is actuated to discharge the pulse forming network through load 4. A hydrogen thyratron device is commonly used for the switching means although other devices such as rotary spark gaps or saturable core inductors may be employed. If it is desirable to have a firing repetition period that differs from the time interval required to charge the network to its maximum potential a diode may be inserted serially between the charging impedance and the pulse forming network, so that the network once charged to its maximum potential will retain that potential until the next firing of the switch 10. If the impedance of load 4 equals the characteristic impedance of the network 3 the pulse amplitude appearing across the load, when the switch is actuated, will equal approximately one-half of the total voltage across network 3. If the load impedance increases, the load pulse amplitude increases. If the load is open and the load impedance is infinite, the pulse amplitude rises to the network potential which is approximately 1.9 times the voltage of power supply 1. It is the function of elements 5 through 7 to prevent such undesirable increases in load potential.

Diode 6, connected serially with capacitor 5 across load 4, is poled so that capacitor 5 initially charges when a pulse voltage appears across load 4 because of the discharge of network 3. If it is assumed that power supply 1 has a positive potential at junction 9, in respect to common line 11, the network 3, at the time of discharging will have a negative potential at the junction of the network 3 and load 4 in respect to the potential at common line 11. Diode 6 is thus illustrated with its cathode connected to capacitor 5 at junction 8 and with its anode connected to common line 11, so that it will conduct during the time of pulse firing, and capacitor 5, whose capacitance is substantially greater than the storage capacitance of network 3, charges so as to have a negative potential at the junction of devices 3 and 4 in respect to the potential at terminal 8 and common line 11. Capacitor 5 charges substantially to the potential across the load 4 at a rate determined by its capacitance. The capacitance of capacitor 5 may, for example, be sufficiently great in respect to the capacitance of network 3 so as to charge within 10 to 20 pulse transmissions after the modulator is first fired. Diode 7 conducts during the interpulse period, i.e. the time between pulses, whenever the load voltage, and thus the voltage of capacitor 5, substantially exceeds the output voltage of power supply 1. For the above described circuit polarities, diode 7 has its anode connected to junction 8 and its cathode to junction 9. During the interpulse period, when there is no load voltage, capacitor 5 is effectively connected across the series combination of diode 7 and power supply 1, and diode 7 conducts to discharge capacitor 5 to the potential of power supply 1. In normal system operation capacitor 5 thus charges for the first few pulses of the system until the capacitor voltage equals the load voltage. Diode 6 is poled to prevent discharge of capacitor 5. If the load impedance rises and the voltage across load 4 increases, capacitor 5 receives pulse energy in order to charge to a higher voltage level. The rate of voltage rise is a function of the capacitance of capacitor 5. When the voltage across the capacitor 5 exceeds the power supply voltage, the capacitor discharges through diode 7 at a rate that also is a function of the capacitance. Thus capacitor 5 and diodes 6 and 7 comprise a non-energy dissipating circuit for preventing excessive voltage increases in load 4.

Figure 2:
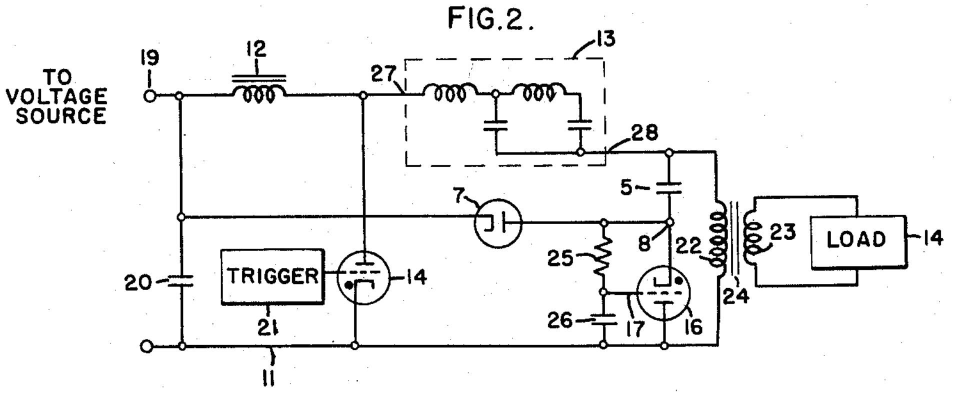
FIG. 2 is a schematic circuit diagram of a line-pulsing modulator and voltage control circuit.

FIG. 2 illustrates a preferred embodiment of the invention in which a high potential power supply is connected in parallel with a storage capacitor 20 between input terminal 19 and common line 11, so that the polarity at 19 is positive in respect to that at 11. Charging reactance 12, pulse forming network 13, and the primary winding 22 of output transformer 24 are serially connected from terminal 19 to line 11. The charging reactance 12, is connected between terminal 19 and input 27 of pulse forming network 13. The pulse forming network is illustrated as having two L sections with the series inductor of the first L section connected from input 27 to the junction of the first parallel capacitor and the input of the second series inductor. A second parallel capacitor, one side of which is connected to the output of the second inductor, has its other side connected to the first parallel capacitor at output terminal 28. Output terminal 28 is connected to the primary winding 22 of pulse transformer 24 whose secondary winding 23 is connected to load 14, which may be a magnetron. The other side of primary winding 22 is connected through common line 11 to capacitor 20, a standard component of the high voltage input circuit. A gas type triode 14, the switch, has its anode connected to input 27 of network 13 and its cathode connected to line 11. The device is fired by a signal applied from trigger source 21 to the grid of device 14. The triode switch 14 is normally extinguished by the inverse potential applied across it at the end of the pulse by selecting the apparent load impedance of primary winding 22 to be slightly less than the characteristic impedance of network 13. In order to return the network to zero potential at the beginning of the next charging period, a diode may be connected in parallel with switch 14 and poled to conduct whenever the voltage at network input 27 is negative in respect to line 11.

Capacitor 5 is connected from pulse forming network output 28 to junction 8, and diode 7 has its anode connected to junction 8 and its cathode connected to voltage source terminal 19. A gas firing triode 16, such as a hydrogen thyratron, is illustrated in lieu of the diode 6 illustrated in connection with FIG. 1. The cathode of device 16 is connected to junction 8 and the anode is connected to common line 11. The device is made self-triggering by connecting capacitor 26 from the anode and common line 11, to the grid 17 of device 16. The grid 17 is returned to junction 8 and the cathode of device 16 by resistance 25, which discharges the triggering capacitor 26. A high voltage breakdown device such as a thyrite resistor may be connected in parallel with resistor 25 so as to insure that the cathode to grid potential does not rise excessively. As described in connection with device 6 of FIG. 1, device 16 is oriented so that it conducts during the pulse firing period to charge capacitor 5 toward the potential of primary 22 when the voltage on capacitor 5 is below the voltage across primary 22. Diode 7, as described in connection with FIG. 1, is oriented so that it conducts during the interpulse period when the voltage across capacitor 5 exceeds the voltage of the power source which appears across capacitor 20. The type of uni-directional conducting means utilized whether a gas firing triode 16 or a diode, such as device 6 illustrated in FIG. 1, is an arbitrary matter of design. However, gas firing triodes may in some cases be preferable since their large peak inverse voltage rating exceeds the large inverse potential that is suddenly applied across the uni-directionally conducting device at the end of the pulse. This inverse potential occurs because the net cathode to plate voltage on device 16 comprises the algebraic sum of the voltages across device 5 and primary winding. This sum voltage is generally small or in the forward direction during pulse firing, because it is the difference between the load and capacitor voltages. When the pulse terminates the voltage across primary 22 decays rapidly to zero so that device 16 is rapidly back biased by the voltage across capacitor 5.

Figure 3:
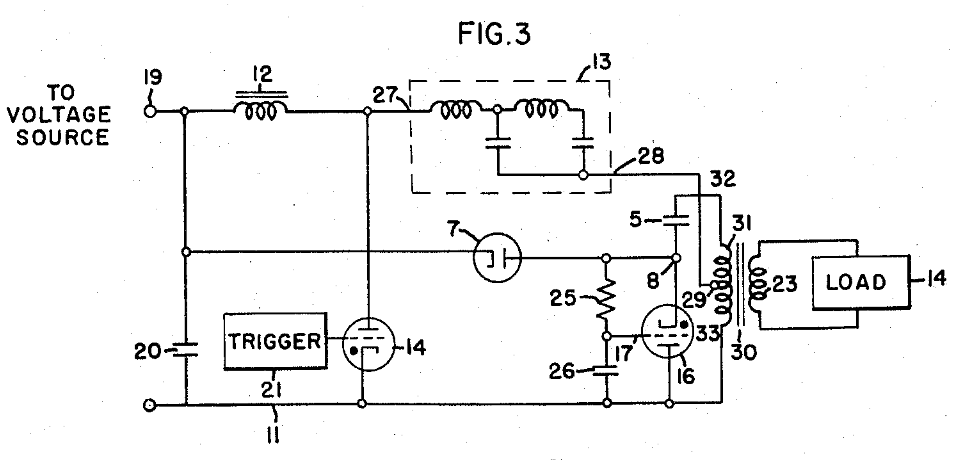
FIG. 3 is a schematic circuit diagram of an embodiment of a line-pulsing modulator and voltage control circuit in which the output transformer connections differ from those illustrated in FIG. 2.

The circuit described in connection with FIG. 2 controls modulator output pulse amplitudes so as to prevent excessive increases in voltages, which could cause the destruction of modulator or transmitter components. Occasionally it may be necessary to control the pulse amplitude even more closely so as to avoid any variations in the voltage amplitude of the pulse. Such variations may be caused not only by variations in load impedance but also may be due to voltage ripples on the pulse due to imperfect characteristics of the pulse forming network. The embodiment of FIG. 3 is designed to limit the modulator pulse so as to provide an accurately limited pulse amplitude, irrespective of increases in load impedance or imperfections in the pulse forming network. This is accomplished by increasing the potential to which capacitor storage means 5 is charged in respect to the primary winding voltage of the pulse transformer that is coupled to the secondary winding. The circuit of FIG. 3 corresponds to that of FIG. 2 except for the connections to the primary winding of the pulse transformer, and like components are labeled with like numerals. Pulse transformer 30 of FIG. 3 has a tapped secondary winding 31 whose tap 29 is connected to the output connection 28 of the pulse forming network 13. One end terminal, 33 of the secondary winding is connected to common line 11 and the other end terminal 32 is connected to capacitor 5. The primary winding portion 29–33 couples the pulse output to secondary winding 23, while the primary winding portion 29–32 provides an additive voltage to that of portion 29–33 for charging capacitor 5. If the turns ratio of the primary winding sections 32–29 is selected properly the potential on capacitor 5 exceeds the voltage across capacitor 20 sufficiently so that diode 7 will conduct during every pulse interval so as to clamp the potential across the winding portion 29–33 to a predetermined stable amplitude.

Figure 4:
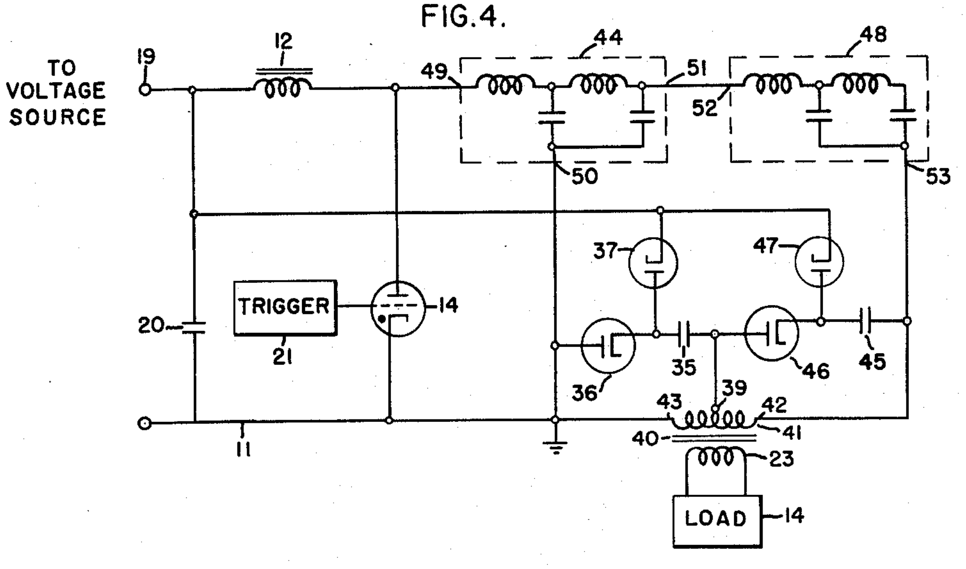
FIG. 4 is a schematic circuit diagram of a line-pulsing modulator employing two pulse forming networks with another embodiment of the voltage control circuit.
Figure 5:
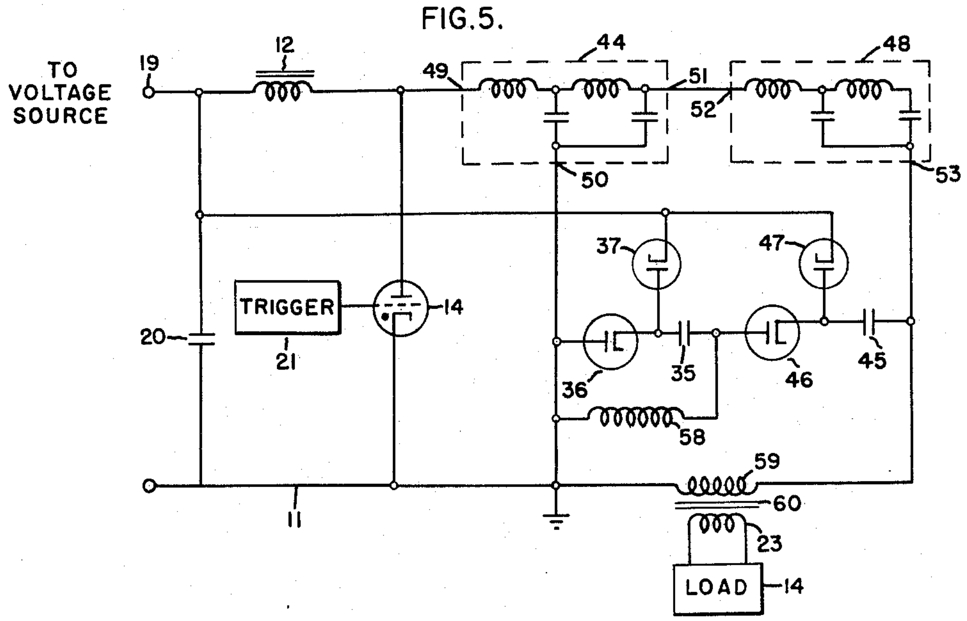
FIG. 5 is a schematic circuit diagram of a circuit having different load transformer connections from those illustrated in FIG. 4.

FIGS. 4 and 5 relate to the application of a maximum voltage control circuit to a modulator of the type employing a plurality of pulse forming networks so as to provide a pulse output amplitude greater than the supply voltage. FIG. 4 illustrates such a modulator with its associated control system. The modulator portion comprises a high voltage input circuit between terminal 19 and common line 11. Capacitor 20 is also connected between common line 11 and terminal 19. The charging reactance 12 is serially connected between terminal 19 and input 49 of the first pulse forming network 44. Both pulse forming networks comprise a chain of L sections with series inductances and output shunt capacitances. Input 49 is connected to the input of the first series inductor. A first output terminal 50, connected to the common connections of the parallel capacitors of network 44, is connected to common line 11. A second output terminal 51 internally connected to the junction of the final inductor and capacitor of network 44, is connected to input terminal 52 of pulse forming network 48. Output terminal 53 of network 48 is connected to end terminal 41 of the output transformer primary winding 41. Terminals 52 and 53 correspond respectively, to terminals 49 and 50 of network 44. The output transformer secondary winding has its other end terminal, 43, connected to common line 11. The output transformer secondary winding 23 is connected to load 14.

Two clipping circuits are employed to provide voltage control. A series circuit comprising unilaterally conducting means 36, which may be a diode, and charge storage means 35, which may be a capacitor, is connected between end terminal 43 and center tap 39 of transformer primary winding 41, with the charge storage means being connected to center tap 39 and diode 36 being poled so as to conduct during the pulse firing period, as described in connection with diode 6 of FIG. 1. Unilateral conducting means 37, which may be a diode, is connected from voltage source terminal 19 to the junction of devices 36 and 35 and is poled so as to conduct during the interpulse interval if the voltage across capacitor 35 exceeds the voltage output of the voltage source. Unilateral conducting means 46 and charge storage means 45 are connected serially across the primary winding portion 39–42, with charge storage means 45 being connected to primary winding end terminal 42 and diode 46 being poled so as to conduct during the pulse firing if the voltage across charge storage means 45 is less than the voltage across primary winding portion 39–42. Diode 47 is connected from the voltage source terminal 19 to the junction of devices 46 and 45 and is poled so as to conduct during the interpulse interval if the voltage on device 45 exceeds the voltage of the high voltage source. During normal operation the voltage across the entire primary winding 41 will be approximately twice the voltage across capacitor 20. One-half of this voltage, or approximately the voltage across capacitor 20 will appear across devices 36 and 35. Thus the network comprising devices 35, 36, and 37 will operate in the same manner as devices 5, 6, and 7 described in connection with FIG. 1. Similarly, during normal operation, the voltage across the primary winding portion 39–42 will correspond to the voltage on capacitor 20 so that during pulse firing, device 45 will charge to a voltage approximately equal to that of capacitor 20. During the interpulse interval the voltage across the primary winding 41 will decay rapidly so that device 47 thus has its anode connected serially with charge storage means 45 to an effective ground. Capacitor 20 and device 45 will therefore be connected in a closed circuit through diode 47, with the voltages across capacitor 20 and device 45 having opposite polarities. If the voltage across the latter exceeds the voltage of the former the diode will conduct in the same manner as described in respect to device 6 of FIG. 1. It may thus be seen that the control circuit of FIG. 4 limits the primary winding voltage of the pulse transformer to the same degree as described in connection with FIG. 1.

FIG. 5 illustrates an embodiment similar to that of FIG. 4, but which does not require a primary winding center tap. The circuit of FIG. 5 is identical to that of FIG. 4 with the exception of the connections made to the primary winding of the output transformer and like components are designated by like numerals. In lieu of connecting the junction of devices 35 and 46 to the center tap of the primary winding, the connection is instead made through a separate inductance 58. This inductance is connected from common line 11 to the junction devices 35 and 46. With identical capacitance values for devices 35 and 45 and with the proper inductance of device 58 the potential at the junction of devices 35 and 46 can be selected to be intermediate that appearing at the junction of devices 45 and output terminal 53 of pulse forming network 48.

The systems disclosed in FIGS. 4 and 5 operate so that when the system is first turned on charge storage means 35 and 45 load the system for the first pulses until the charge storage of a total voltage charge corresponds to the voltage across the pulse transformer primary winding. Diodes 36 and 46 are poled so as to prevent the charge storage means from discharging. If the load impedance rises, and the primary winding voltage tends to increase towards twice the normal voltage, charge storage means 35 and 45 receive almost the entire pulse energy and their value determines the rise of the primary winding voltage. Since charge storage means 35 and 45 have an equal capacity they are each charged to half of the primary voltage.

If it is desired to closely limit the primary voltage, the charge storage means may be charged from higher potentials with the aid of extra winding sections on the primary of the pulse transformer, in the same manner as discussed in connection with FIG. 3.

Obviously many modifications and variations of the present invention are possible in the light of the above teachings. It is, therefore, to be understood that within the scope of the appended claims, the invention may be practiced otherwise then specifically described.

What we claim and desire to secure by Letters Patent of the United States is:

1. In combination in a pulse generating circuit, a pulse forming network, means to periodically charge said network to a first predetermined potential during a first time interval, an output transformer having a primary winding and a secondary winding, said secondary winding including means adapted for connection to a load circuit, means to periodically discharge said pulse forming network through said primary winding to produce a voltage pulse across said primary winding during a second time interval, means to limit the voltage level of said pulse comprising a capacitor and first uni-directionally conducting means serially connected across said primary winding, said first uni-directionally conducting means being poled to charge said capacitor toward the pulse voltage during said second time interval, a source of second predetermined potential, second uni-directionally conducting means connected between said source and the junction of said capacitor and said first uni-directionally conducting means and poled to discharge said capacitor toward the source potential during said first time interval.

2. In combination in a pulse generating circuit, a pulse forming network, means to periodically charge said network to a first predetermined potential during a first time interval, an output transformer having a primary winding, said primary winding and a secondary winding comprising a plurality of serially connected winding portions, said secondary winding including means adapted for connection to a load circuit, means to periodically discharge said network through a first of said winding portions to produce a substantially rectangular voltage pulse across said first winding portion during a second time interval, means to limit the voltage level of said pulse comprising a capacitor and a first uni-directionally conducting device serially connected across said plurality of serially connected winding portions, said first conducting device being poled to charge said capacitor during said second time interval toward a pulse voltage level greater than that appearing on said first winding portion, a source of second predetermined potential, a second uni-directionally conducting device connected between said source and the junction of said capacitor and said first device and poled to discharge said capacitor during said first time interval toward the potential of said source.

3. In combination a capacitive storage network, an output transformer having a primary winding and a secondary winding, said secondary winding including means adapted for connection to a load circuit, said network and said primary winding being connected in series combination, charging means connected to said series combination for periodically charging said network to a first predetermined potential during a first time interval, discharge means connected to said series combination for periodically discharging said network during a second time interval to produce a substantially rectangular voltage pulse across said primary winding, means to limit the voltage level of said pulse comprising a capacitor and a first uni-directionally conducting device serially connected across said primary winding, said capacitor being connected to the junction of said network and said primary winding, said first uni-directionally conducting device being poled so that said capacitor charges toward the load voltage during said second time interval, a source of second predetermined potential, a second uni-directionally conducting device connected from said source to the junction of said capacitor and said first uni-directionally conducting device and poled to discharge said capacitor toward the potential of the source during said second time interval.

4. In combination in an electric pulse generating circuit a pulse transformer having a primary winding and a secondary winding, said secondary winding including means adapted for connection to a load circuit, the combination of a uni-directional voltage source, a charging impedance, and a pulse forming network serially connected in a closed loop with said primary winding, periodically actuated switching means connected across the series combination of said pulse forming network and said primary winding, first and second uni-directionally conducting devices serially connected in opposing directions of conductivity across the series combination of said charging impedance, pulse forming network and primary winding, a capacitor connected from the junction of said pulse forming network and said primary winding to the junction of said first and second uni-directionally conducting devices.

5. An electric pulse generating circuit comprising a pulse transformer having a primary and a secondary winding, said secondary winding including means adapted for connection to a load circuit, said primary winding comprising serially connected first and second winding portions, the combination of a uni-directional voltage source, a charging impedance, and a pulse forming network serially connected in a closed loop with said first winding portion, periodically actuated switching means connected across the series combination of said pulse forming network and said first winding portion, a capacitor and a first uni-directionally conducting device serially connected across said serially connected first and second winding portions, a second uni-directionally conducting device connected between the junction of said source and said charging impedance and the junction of said first device and said capacitor.

6. In combination in a pulse generating circuit a pulse transformer having a primary winding and a secondary winding, said secondary winding including means adapted for connection to a load circuit, means for impressing a periodical voltage pulse across said primary winding, means to limit the pulse amplitude across said primary winding comprising a capacitor and a first uni-directionally conducting device connected in series combination across said primary winding, said first device being poled to charge said capacitor during the occurrences of said pulse, a source of predetermined constant potential, a second uni-directionally conducting device connected between said source and the junction of said capacitor and said first device, said second device being poled to discharge said capacitor toward said source potential during the non-occurrence of a pulse.

7. In combination in a pulse generating circuit, a source of uni-directional potential, a plurality of pulse forming networks, means connected between said source and said networks to periodically charge said networks during a first time interval, a pulse transformer having a primary winding and a secondary winding, means to periodically discharge said networks through said primary winding during a second time interval to produce a voltage pulse across said primary winding whose potential is substantially twice that of the source potential, means to limit the voltage amplitude of said pulse comprising the combination of a first uni-directionally conducting device, a first capacitor, a second uni-directionally conducting device and a second capacitor serially connected across said primary winding so that said first and second capacitor equally charge during said second time interval toward one half of the pulse amplitude, a third uni-directionally conducting device connected between said source and the junction of said first capacitor and first device, and a fourth uni-directionally conducting device connected between said source and the junction of said second capacitor and second device so that said first and second capacitors discharge toward the source potential during said first time interval.

References Cited in the file of this patent

UNITED STATES PATENTS

| | | |
|---|---|---|
| 2,677,053 | Nims | Apr. 27, 1954 |
| 3,056,088 | Stearns | Sept. 25, 1962 |